Sept. 21, 1926.  
P. O. ROWLANDS  
1,600,366  
INTERNAL COMBUSTION LOCOMOTIVE  
Filed Sept. 19, 1924  
2 Sheets-Sheet 1

Inventor:-
Percy O. Rowlands
by Barthel & Barthel
Attorneys.

Sept. 21, 1926.
P. O. ROWLANDS
1,600,366
INTERNAL COMBUSTION LOCOMOTIVE
Filed Sept. 19, 1924     2 Sheets-Sheet 2
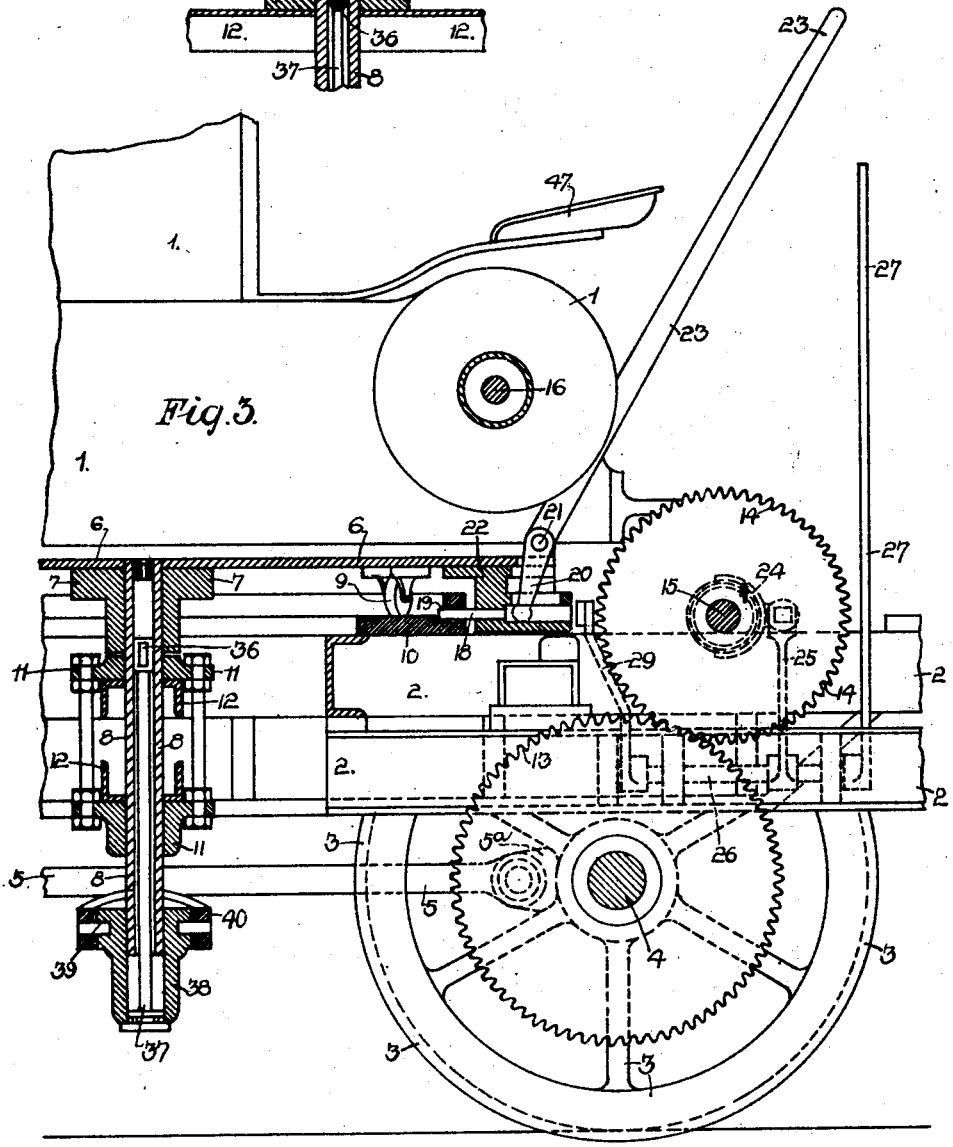
Inventor:
Percy O. Rowlands,
by Barthel+Barthel,
attys.

Patented Sept. 21, 1926.

UNITED STATES PATENT OFFICE.

PERCY OCTAVIUS ROWLANDS, OF BIRMINGHAM, ENGLAND.

INTERNAL-COMBUSTION LOCOMOTIVE.

Application filed September 19, 1924, Serial No. 738,662, and in Great Britain September 27, 1923.

This invention has reference to locomotives adapted to run on rails and which are propelled by internal combustion engines; and has for its object to enable a locomotive to travel in either direction with equal facility, and so that the driver, whilst seated in driving position, shall always face the direction in which the locomotive is moving.

Broadly my invention comprises, in combination, a frame with flanged wheels and a pair of axles; a motive power unit consisting of an internal combustion engine and driving shaft, said power unit being pivotally or revolubly mounted on said locomotive-frame; and means whereby operative connection between the driving shaft of said power unit and either of the locomotive axles may be effected at will for the purpose of reversing the direction of motion of the locomotive.

In carrying out my invention, I prefer to arrange for a road or farm tractor, preferably of the "Fordson" type, to be mounted in a simple and convenient manner upon a frame fitted with flanged wheels, the axles of which are connected together by cranks and coupling rods, so as to run upon rails as a locomotive. Therefore, all the gear changes provided on the tractor, when used as a locomotive, will be usable when travelling in either direction without special reversing gears being fitted for this purpose, as farm or road tractors can only normally use one gear ratio when running in the backward direction.

I will further describe my invention with the aid of the accompanying sheets of explanatory drawings, which illustrate, by way of example only, one mode of carrying my invention into effect.

In said drawings:—

Fig. 1 is an elevation, and

Fig. 2 is a plan of a locomotive embodying my improvements.

Fig. 3 is a section drawn to an enlarged scale as compared with the preceding views, and taken as on line A—B—C—D, Fig. 2.

Fig. 4 is a portion of Fig. 3, taken at right angles thereto.

There is provided a tractor from which the four road wheels and front axle have been removed, the body 1 (comprising engine, crank shaft casing, gear box, driving shaft and casing, together with all control mechanism and pipe connections, radiator, fuel and water tanks, cooling fan, et cetera) being revolubly mounted, as a single unit, upon a locomotive-frame 2 provided with flanged driving wheels 3 mounted on axles 4 and connected by coupling rods 5 and cranks 5ª. Said tractor 1 is mounted on a plate 6 whereto is attached by the aid of a flange 7 a tubular pivot pin 8 located near the centre of the length and width of the tractor body 1; also attached to the underside of said tractor-carrying-plate 6 are conical rollers 9 (Fig. 2) which are arranged to run on a roller-ring 10; said flange 7 is adapted to revolve upon the upper of a pair of bearings 11, 11, (Fig. 3) carried by transverse channel members 12 of the locomotive-frame 2. Thus said plate 6 with tractor body 1 may be turned at will upon said pivot pin 8 and roller-ring 10 in a horizontal plane.

On each locomotive axle 4 is affixed a spur gear wheel 13, said wheels being disposed on opposite sides of the longitudinal centre line between the driving wheels 3. Intermediate spur wheels 14 adapted to mesh with said axle spur wheels 13 are slidably mounted on shafts 15 carried on the locomotive-frame 2.

Upon an end of the tractor driving shaft 16 is secured a spur gear wheel 17, which, when the tractor body 1 is locked in a central position on the longitudinal axis of the locomotive-frame and with its driving shaft 16 parallel with the axles 4, will mesh with one or other of said intermediate spur wheels 14.

The locking of the tractor 1 to the locomotive-frame 2 is effected by means of a pair of pins 18 (Figs. 1 and 3) which are adapted to enter passages 19 formed for their reception in the roller-ring 10, said pins 18 being actuated by means of levers 20 connected by a spindle 21 which is supported by a transverse casting 22 (Fig. 3) secured to the underside of the tractor-carrying-plate 6.

Said pins 18 are simultaneously moved into or out of engagement with said roller-ring passages 19 by means of a hand lever 23 the lower end of which is affixed to said lever-connecting spindle 21.

The sliding of an intermediate spur wheel 14 is effected by the aid of a fork 24 (Fig. 3) which engages a groove provided in the wheel boss; said fork being connected with an arm 25 secured to a pivotally-carried spindle 26, whereto a hand lever 27 is attached.

To enable the locomotive to move with facility in a direction contrary to that in which it has been travelling, intermediate spur wheel 14 is slid out of mesh with spur wheel 17, said tractor locking pins 18 are withdrawn from roller-ring passages 19, and the tractor body 1 revolved half a turn on its central pivot pin 8, when the spur wheel 17 mounted on its driving shaft 16 will be in position to mesh with the corresponding intermediate spur wheel 14 slidably mounted on its shaft 15 disposed above the other locomotive-frame axle 4, said intermediate spur wheel 14 being in constant mesh with the spur wheel 13 fixed correspondingly on this axle 4, by reason of the greater width of the teeth provided on said spur wheel 13.

It will, therefore, be clear that either of the locomotive-frame axles 4 may be connected at will to the driving shaft 16 of the tractor 1, so reversing the direction of motion of the locomotive, whilst enabling the driver to always face the direction in which the locomotive is moving.

As the intermediate wheels 14 are arranged to slide along their shafts 15 on which they are free to rotate, the gear wheel 17 of the driving shaft 16 of tractor 1 may be engaged with either of said intermediate gear wheels 14 without likelihood of damage to its teeth; and, in operation, before the locking mechanism is released the intermediate wheel 14 will be slid on its shaft 15 to disengaging position.

Thus, when the locking mechanism is released, the tractor 1 may be swung around half a turn to a locating stop 28, (Fig. 2) in which position the gear wheel 17 upon the tractor-driving shaft 16 will be directly over the corresponding gear wheel 13 fixed upon the locomotive axle 4 at that end of the frame, and the intermediate wheel 14 may then be slid into engagement, and the tractor locked rigidly to the frame 2.

Said intermediate wheels 14 serve a double purpose of transmitting motion from the tractor-driving shaft, 16 to a locomotive-frame axle 4 in the correct direction, and also, owing to their being adapted to be slid out of the way, facilitate the operation of swinging the tractor body 1 out of engagement with one of the locomotive axles 4 and into engagement with the other. Thus it is rendered possible for both the outward and return journeys to be performed whilst the driver is in the most advantageous position to control the locomotive and see where he is going.

When operating in the forward direction, the locomotive may be reversed by means of the reverse gear normally provided in the tractor gear box, but as this usually consists of but one gear ratio, it is only suitable in the case of a locomotive for moving very short distances, especially as the driver whilst operating the controls cannot readily see where he is going.

The operations of locking and unlocking the tractor body 1, sliding the intermediate gear wheel 14 out of engagement, swinging the tractor body half around to its stop 28, and engaging its driving shaft 16 with the opposite locomotive-frame axle 4 through the gearing described, will preferably be arranged to be performed in correct sequence by the driver without leaving his seat, whilst the engine is running and the tractor gear lever is in neutral position; but alternatively, these operations may be independently carried out.

In order to prevent an intermediate gear wheel 14 from being slid into engagement with gear wheel 17 on the driving shaft 16 of the tractor 1 before the latter is locked to the locomotive frame, there is provided on shaft 26 (Figs. 1 and 3) an arm 29 which moves synchronously with the gear-shifting lever 27, so that when the gears are slid into mesh the upper end of arm 29 moves behind a locking-pin 18. Consequently, before the locking pins 18 may be withdrawn from roller-ring passages 19, the intermediate wheel 14 will have to be moved to its inoperative position by lever 27, the check or stop arm 29 simultaneously moving out of the path of the locking pin 18. Conversely, locking pins 18 must be pushed into their passages 19 of roller-ring 10 before arm 29 is free to move again into alignment with pin 18.

It may be preferable, as an alternative to sliding said intermediate wheels 14 along their shafts 15, to engage same permanently with the gear wheels 13 of the locomotive-frame axles 4, and, by adopting teeth of sufficiently coarse pitch chamfered on their entering edges, to engage them with the gear wheel 17 on the tractor-driving shaft 16 having similarly chamfered teeth, providing adequate tooth clearance is allowed for.

It will, of course, be necessary either to lock the differential gear on the tractor-driving shaft, or otherwise render it inoperative.

The braking of the locomotive is effected by means of a hand-wheel 30 through rocking arm 31, link 32, bell crank 33, and jointed link 34 which is connected to one end of pivoted lever 35 the other end of which lever engages in a slot 36 provided in the head of a central rod 37. The lower end of said central rod 37 is rotatably connected to a sliding collar and cap 38, which collar and cap are adapted to slide on tubular pivot pin 8. Engaging in groove 39 of said sliding collar and cap 38 is a forked lever 40 connected at 41 by link 42 to toggle levers 43 which apply the swinging brake shoes 44.

Said tubular pivot pin 8 is provided with a slot 45, opposite slot 36, of sufficient length to provide clearance for the movement of lever 35 which passes through it.

Curved hand rails 46 are provided at either end of the locomotive frame, by means of which the driver when seated in driving position on seat 47, may cause the tractor to swing as desired.

A screw 48 is provided to lock hand wheel 30.

Whilst the invention has been described mainly in relation to its preferred forms, it will be obvious that modifications may be made without departing from its spirit and scope as defined by the claims.

What I claim as my invention and desire to secure by Letters-Patent is:—

1. A locomotive adapted to run on rails, comprising, in combination, a frame, a pair of axles supported by said frame, flanged wheels on said axles, a motive power unit including a road tractor from which the road wheels and front axle have been removed, said tractor being pivotally and revolubly mounted on the locomotive frame and having a combustion engine and driving shaft, a toothed gear wheel mounted on the driving shaft of the tractor, toothed gear wheels mounted on the axles of the locomotive frame, a pair of slidable intermediate toothed gear wheels by the aid of which operative connection may be effected between the gear wheel of the tractor driving shaft or one or the other of the gear wheels on the axles of the locomotive frame for the purpose of reversing the direction of motion of the locomotive.

2. A locomotive adapted to run on rails, comprising, in combination, a locomotive frame and wheels, a pair of axles, a toothed gear wheel on each of said axles, a pair of intermediate displaceably mounted toothed gear wheels meshing with said axle gear wheels, and, pivotally mounted on said frame, a motive power unit consisting of an internal combustion engine and driving shaft, and a toothed gear wheel mounted on said driving shaft which by the aid of the said pivotal mounting and displacement of said intermediate gear wheels, may operatively engage, at will, either of said gear wheels on the said axles of the locomotive frame.

3. In a locomotive as claimed in the preceding claim, a brake or brakes operable by the driver in an angular position of the power unit relative to the locomotive-frame, through mechanism associated with an operating rod which is disposed on the pivotal center of said power unit.

4. In a locomotive as claimed in claim 2, means designed to prevent operative connection between the motive power unit and locomotive frame unless and until said motive power unit is locked in the position desired; substantially as described.

5. A locomotive adapted to run on rails, comprising, in combination, a locomotive frame and wheels, a pair of axles, a toothed gear wheel on each of said axles, a pair of intermediate toothed gear wheels capable of meshing with said axle gear wheels; and, pivotally mounted on said frame, a motive power unit consisting of an internal combustion engine and driving shaft, and a toothed gear wheel mounted on said driving shaft, which toothed wheel, by the aid of said pivotal mounting and in combination with either of said axle gear wheels and intermediate gear wheels, may operate either of said locomotive axles.

In testimony whereof I affix my signature,

PERCY OCTAVIUS ROWLANDS.